United States Patent [19]

Phillips et al.

[11] 4,218,490

[45] Aug. 19, 1980

[54] FUNCTIONAL PROTEINS

[75] Inventors: David J. Phillips, Plasmarl; David T. Jones, Ystalyfera; Douglas E. Palmer, West Cross, all of Wales

[73] Assignee: Viscose Group Limited, Croydon, England

[21] Appl. No.: 789,436

[22] Filed: Apr. 20, 1977

[30] Foreign Application Priority Data

Apr. 23, 1976 [GB] United Kingdom ............... 16674/76

[51] Int. Cl.² .................... A23J 3/00; A21D 13/00; A23L 1/31; A23L 2/00

[52] U.S. Cl. ............................ 426/549; 426/553; 426/558; 426/559; 426/568; 426/571; 426/573; 426/574; 426/615; 426/641; 426/643; 426/656; 426/657; 426/654

[58] Field of Search ............... 426/271, 564, 573, 583, 426/549, 570, 571, 572, 641, 646, 656, 553, 558, 559, 568, 573, 574, 615, 643; 260/112 R, 112 B, 112 G; 204/180 B; 252/356

[56] References Cited

U.S. PATENT DOCUMENTS

| | | | |
|---|---|---|---|
| 2,695,235 | 11/1954 | de Goede | 426/583 |
| 3,487,064 | 12/1969 | Swanson et al. | 426/583 X |
| 3,573,271 | 3/1971 | Nielsen | 426/583 X |
| 3,876,805 | 4/1975 | Craig et al. | 426/583 X |
| 3,896,240 | 7/1975 | Gruette et al. | 426/583 X |
| 3,896,241 | 7/1975 | Malaspina et al. | 426/271 |
| 3,922,375 | 11/1975 | Dalan et al. | 426/583 |
| 3,930,056 | 12/1975 | Feminella et al. | 426/583 X |
| 3,935,323 | 1/1976 | Feminella et al. | 426/583 X |
| 3,941,895 | 3/1976 | Ash et al. | 426/583 X |
| 3,982,039 | 9/1976 | Scibelli et al. | 426/583 X |
| 4,029,825 | 6/1977 | Chang | 426/271 |
| 4,036,999 | 7/1977 | Grindstaff | 426/583 X |

FOREIGN PATENT DOCUMENTS 1227906  4/1971  United Kingdom.

*Primary Examiner*—Robert A. Yoncoskie
*Attorney, Agent, or Firm*—Kane, Dalsimer, Kane, Sullivan and Kurucz

[57] ABSTRACT

The disclosure is of the extraction by ion exchange and use, especially in edible materials, of functional protein material having one or more useful surface-active properties such as foaming, foam stabilization, gelation, or water-or fat-binding characteristics.

10 Claims, No Drawings

FUNCTIONAL PROTEINS

BACKGROUND OF THE INVENTION

1. Field of the Invention

This invention relates to functional proteins and their use in manufacturing compositions of matter, more especially edible materials and structural materials.

2. Brief Description of the Prior Art

It has previously been proposed to use proteins, for example, egg albumin, as foaming agents in processes for making food products, for example, meringues. It has also been proposed to use proteins as foaming agents in the manufacture of building materials, for example, concrete. As will be appreciated, such uses of proteins are based on their physical functional properties rather than their nutrient value.

SUMMARY OF THE INVENTION

The present invention is based on the observation that proteins extracted from protein sources by ion-exchange generally possess one or more surprisingly good functional properties, depending on the intrinsic functional capability of the protein concerned.

The present invention provides a method of manufacturing a composition of matter, which includes an operation which is promoted or assisted by the presence of a surface-active agent, wherein the surface-active agent comprises a functional protein material obtained from a protein source by an isolation process, said isolation process involving extraction of protein onto an ion-exchange material by ion-exchange interaction between the ion-exchange material and the protein source and recovery of protein from the ion-exchange material.

The functional protein material used as a surface-active agent according to the invention may comprise a protein, a mixture of proteins, or a mixture of one or more proteins with protein breakdown products.

DETAILED DESCRIPTION OF THE INVENTION

The invention is primarily concerned with the use of proteins which have an intrinsic functional capability in terms of one or more of the following surfactant properties: foaming, foam stabilisation, water-binding, fat-binding, and gelling. The isolation of protein from protein sources by a process of ion-exchange extraction will typically result in a protein isolate which, as compared with protein obtained from the same source by other methods (especially ultrafiltration, diafiltration and precipitation techniques) possesses superior and/or more widely utilisable functional properties especially as regards properties dependent on surface activity. Especially good results are obtained, in terms of foaming and gelation properties, from protein isolates produced by ion-exchange extraction from milk whey.

The reason for the unexpectedly good functional properties of protein isolates according to the invention is not fully understood, but the improvement is believed to stem partly from the relatively low content of contaminant substances in protein material obtainable by ion-exchange extraction, and partly from certain changes in the protein tertiary structure caused by the ion-exchange process itself. Indeed, whereas laboratory studies of protein structure seek to maintain proteins in their native state during isolation, the present invention in general utilises changes deliberately induced in the protein structure.

The solubility characteristics of functional proteins are of course of considerable importance, and to some extent determine the range of usefulness of the proteins. It is a feature of protein isolates obtained, according to the invention by ion-exchange extraction, that they are generally soluble over a pH range different from protein concentrates or isolates obtained from the same sources by other methods. The solubility may also be different at a given pH. Some control over the solubility characteristics of the protein isolate may be exercised by varying the conditions used in the ion-exchange isolation process.

It will be appreciated that the functional proteins influence the overall physical characteristics of the compositions of matter made according to the invention, and may therefore be regarded as "physical modifiers", although they will of course also have some nutritional value in certain cases.

The invention also provides functional protein obtained from a protein source by an isolation process involving extraction of protein onto an ion-exchange material by ion-exchange interaction between the ion-exchange material and the protein source and recovery of protein from the ion-exchange material.

In general, depending on the nature of the compositions, the constituents of the compositions of matter according to the invention may be, for example, fillers, diluents, bulking agents, reinforcing agents, foodstuffs components, binders, pore-forming agents etc., and the functional protein material may be incorporated as a physical modifier at any appropriate stage in the manufacture of the composition.

Especially important uses of functional proteins according to the invention are found in food processing, and accordingly the said composition of matter is preferably an edible material which may, of course, be subjected where appropriate to further processing after incorporation of the functional protein. Depending on the particular functional properties concerned, the protein isolate may be used as a foaming agent in, for example, cellular foodstuffs such as, for instance, meringues, sponge cakes, breads, marshmallows and macaroons; or the functional protein may be used as a stabilising water- or fat-binding agent in such materials as sausage mix,, patés, brawns, "Turkey roll", and generally in cohered meat, fish or vegetable preparations.

The functional proteins according to the invention, however, may also find useful application in other fields, for example, in the manufacture of foamed structural materials, especially water-based structural materials such as, for instance, concretes and cements.

In the method of the invention the functional protein obtained by ion-exchange may be used, for example, as sole foaming agent or binding agent, or in admixture or conjunction with one or more other functional additives, for example, foaming agents. An especially useful characteristic of protein material isolated by ion-exchange is that the incorporation of a relatively small proportion (for example, as little as 10% or so based on the total weight of functional agents), has been found to be effective in improving the properties of functional agents such as foaming agents obtained by other methods, for example, protein material obtained by a concentration process such as ultra filtration. The improvement in functional properties obtained in this way is generally greater than would be expected on the basis of an aggregation of the properties of the agents used. Optimum or near-optimum enhancement of functional properties may often be achieved by the incorporation of 25–30% of the ion-exchange protein isolate with another functional agent. Similar improvements in properties which depend on surface activity may also be found where a protein material isolated by ion-exchange is used in conjunction with other surfactant modifiers.

The term "protein source" is intended to denote a material, normally a liquid, preferably aqueous, in which protein material is associated with one or more other substances.

The protein source may be of animal, fish or vegetable origin, for example, egg white or milk; or a liquid extract or waste effluent such as soya whey or extracts from rape seed, groundnuts, palm nuts, sunflower seeds, or olives; or blood (e.g. abattoir effluent) but is preferably milk whey. Thus, for instance, the extracted protein may accordingly be an albumen, for example, egg albumen, lactalbumen or serum albumen, or a globulin, for example, lactoglobulin, or casein. Especially good results in terms of certain functional properties have been obtained with proteins having one or more S- or SH-containing amino acids in the polypeptide chain.

If desired the concentration of protein in the protein source may be increased by some suitable method, for example, ultra-filtration, before the ion-exchange extraction is effected. Other possible concentration methods, include controlled evaporation as, for example, in partial freeze drying and/or vacuum evaporation.

The invention also provides a process for the preparation of a functional surface-active protein, which comprises an isolation process involving extraction of the proteinaceous material onto an ion-exchange material by ion-exchange interaction between the ion-exchange material and the protein source and recovery of the proteinaceous material from the ion-exchange material.

Advantageously, a cellulosic ion-exchange material is used in the protein isolation process, and the ion-exchange material is preferably a regenerated cellulose substituted with ion-exchange groups. An especially preferred ion-exchange material is one made by reaction of cellulose or a cellulose derivative with an activating substance capable of conferring ion-exchange properties thereon, followed by regeneration of the substituted cellulose reaction product into the desired physical form. Such ion-exchange regenerated celluloses (which are described in more detail in British patent specification No. 1 387 265) have especially good exchange capacity for proteins and also exhibit good flow properties. Instead, the ion-exchange material may be one made by activating and cross-linking an already regenerated cellulose (as described, for example, in British patent specification No. 1 226 448).

To make regenerated cellulose and other ion-exchange materials having certain physical characteristics in terms of dimensional stability and insolubility, it may be desirable for the ion-exchange material to be cross-linked, for example, to the extent of from 0.1 to 10% by weight (expressed in terms of the weight of cross-linking agent, if used, as a proportion of the dry weight of the regenerated cellulose). Greater degrees of cross-linking may be appropriate to achieve certain special structures.

Other polysaccharide ion-exchange materials may also be used, for example, substituted starches, dextrans, agaroses (e.g. those sold under the trade name "Sepharose"). In general, any ion-exchange material may be used which has a hydrophilic surface and is capable of adsorbing protein by ion-exchange interaction. For example, the ion-exchange material may be a polyvinyl-alcohol. On the other hand, zeolites and resin-type ion-exchange materials (for example, those based on phenol-formaldehyde resins) will not in general give such satisfactory results.

The ion-exchange extraction may be conducted in any suitable system, for example, a fixed-bed system (such as described, for instance, in British patent specification No. 1 227 906) or in an agitated flow system as described in British patent specification No. 1 436 547, including the possibilities of (a) conducting the ion-exchange extraction under agitated conditions in a vessel having a filter across at least part of its base, whereby the ion-exchange material bearing the adsorbed protein is retained in the vessel whilst the treated protein source passes out through the filter; or (b), the mixture of treated protein source and ion-exchange material bearing adsorbed protein may be passed to an external separator.

A general form of isolation process for use in preparing functional protein for use in accordance with the invention may comprise for example, the following steps:

(a) a liquid protein source (for example, milk whey) is treated with an ion-exchange material (preferably a regenerated cellulose ion-exchange material such as a regenerated carboxymethyl or diethylamino ethyl cellulose, made by effecting ion-exchange activation before regeneration) to extract protein therefrom;

(b) The protein is recovered from the ion-exchange material by a desorption process, typically yielding a dilute solution containing about 1 to 5% protein;

(c) the solution is concentrated to a protein content of about 10% to 30%, for example, by ultra-filtration; and (d) the concentrated solution is dried, for example, by spray-drying or freeze-drying, to give a dry protein product which will typically contain less than 1% fat (say, 0.2–0.3%) and about 3% ash in addition to the protein material. Higher ash contents should be avoided as far as is practicable, as they may adversely affect certain functional properties.

If desired, step (a) can be preceded by an initial concentration step effected, for instance, by ultra-filtration or by a controlled evaporation technique.

Under certain conditions of temperature, pressure, pH and concentration, step (c) may result in gelation of the proteinaceous material. The mechanism of this gel formation (which may be irreversible) is not fully understood, but it may involve a process analogous to polymerisation. The protein gel product is difficult to dry but may in some cases be useful, with or without drying, as a surface-active agent according to the invention.

Experiments involving ion-exchange extraction of protein from milk whey and subsequent ultra-filtration have indicated that the gelation is more likely to occur in isolation processes conducted at relatively high temperatures. It may also be found that S- or SH- containing proteins tend to form the gel during ultra-filtration more readily.

In general, the functional properties of the protein isolate will depend to some extent on the temperature, pressure, pH and ionic strength used in the isolation process. For example, protein isolated from milk whey, in a process operated at 50° C. gives an effective egg white substitute, while the same process operated at 20° C. gives a suitable functional material for use in soft drinks or other beverages.

As will be appreciated, protein-containing products obtained from protein sources such as milk whey by the direct application of processes such as ultra-filtration or diafiltration will contain, in addition to protein, substantial proportions (say, up to 35% or so in total, of materials such as lactose and fats. By contrast, protein material isolated by ion-exchange can be obtained in a relatively uncontaminated state.

Experiments comparing protein-containing material obtained using an ultra-filtration or diafiltration method with protein obtained in accordance with the invention by ion-exchange extraction have shown qualitatively and quantitatively that, for example, the foaming properties of isolates according to the invention are superior. The reason for this superiority is not fully understood.

It will usually be desirable for protein material for use as a surface-active functional agent according to the invention to have a protein content of 90% by weight or more, and protein contents of up to about 96% are obtainable by ion-exchange extraction. In an extraction process operated with recirculation of the ion-exchange material after recovery of protein material therefrom, some control over the protein content of the product may be exercised by varying the extent to which the ion-exchange material is washed after adsorption of the protein and before desorption. More thorough washing leads to a protein isolate having a correspondingly higher protein content. Some rejuvenation of the ion-exchange material before recirculation may also be necessary or desirable. For mixing with dry powders, and also for transport purposes, the protein isolate is conveniently obtained in a dry condition. In principle, however, it can be incorporated with the constituents of the composition of matter in a wet, dry or dissolved condition.

The following examples illustrate the invention:

EXAMPLE 1

Protein was extracted from a milk whey by a process involving ion-exchange extraction using a cellulosic ion-exchange material, followed by recovery, concentration and drying of the protein isolate. The dry isolate was incorporated with water and the mixture beaten to form a foam. Foam volume and drained liquid volume were measured after 30 minutes. A high foam volume and a low drained liquid volume are both indications of good foaming properties of the agent used.

For comparison, the tests were repeated using a protein concentrate obtained from the same milk whey by ultra-filtration, and with a mixture comprising 90% of that material and 10% of the protein isolate obtained by ion-exchange extraction. The results are shown in the following Table:

|  | ultra-filtered product | isolate obtained by ion-exchange | mixture |
|---|---|---|---|
| Foam volume (30 minutes) | 0 (i.e. collapsed) | 140 | 130 |
| Drained liquid volume (30 minutes) | 50 | 28 | 30 |

It will be seen not only that the protein isolate according to the invention had superior foaming properties but also that a mixed foaming agent containing as little as 10% of the isolate exhibited properties almost as good.

EXAMPLE 2

In an ion-exchange process for isolating protein from milk whey, protein isolates having different protein contents were obtained by washing the ion-exchange material to different extents after adsorption of the protein and before desorption. The foam stabilisation properties of the products were evaluated as described in Example 4 below, with the following results:

| Product | Protein content % w/w | Lactose content % w/w | Ash content % w/w | % foam remaining after 30 mins. |
|---|---|---|---|---|
| A | 90.3 | 0.09 | 3.8 | 28 |
| B | 71.3 | 12.10 | 10.5 | 12 |

Product B is clearly inferior to product A in terms of foam stabilisation properties.

EXAMPLE 3

A protein isolate was obtained from milk whey by ion-exchange extraction followed by desorption and concentration to give an aqueous solution of approximately 12% protein content, the isolation process being conducted at 50° C. and similar to that described in Example 5 below.

In standard tests, the resulting protein solution formed a foam which was for practical purposes equivalent to that obtained from a solution of fresh egg white of the same protein content, in terms of both foam volume and foam stability. As shown by the results in the following table, the foaming properties of the ion-exchange isolate according to the invention were very much better than those exhibited in the same tests by a typical protein concentrate obtained by ultra-filtration from the same milk whey. The ultra-filtered (U.F.) concentrate contained approximately 60% protein; 30% lactose and 2–3% fat in addition to the usual ash residues.

| Solutions (based on 12% protein) | Foam volume (cc.) | Drained liquid 5 mins. | volume (mls) 30 mins. |
|---|---|---|---|
| 50 cc. ion-exchange isolate | 180 | 12 | 30 |
| 50 cc. fresh egg white (containing 12% protein) | 175 | 10 | 30 |
| 50 cc. U.F. concentrate | 145 | 50 | foam collapsed |

High foam volume and low drained liquid volume are each indications of good foaming properties.

EXAMPLE 4

50 cc. portions of aqueous solutions (at approximately 12% protein content) of various different mixtures of a protein isolate obtained from milk whey by ion-exchange (the isolation process being conducted at 50° C. and similar to that described in Example 5 with (a) dried skim milk and (b) a dried concentrate obtained from the same milk whey by ultra-filtration were whipped into foams for 3 minutes under standard conditions. The foams were allowed to stand for 30 minutes, after which any separated liquid was drained off. The remaining foam was weighed and the difference from the initial weight of the foam was taken as a measure of the percentage loss.

The following results were obtained:

(a) mixtures of protein isolate with skim milk.

| % isolate in mixture | % foam remaining after 30 minutes (w/w) |
|---|---|
| 0 | foam collapsed |
| 10 | 10 |
| 25 | 32 |
| 90 | 34 |
| 100 | 39 |

(b) mixtures of protein isolate with ultra-filtration concentrate.

| % isolate in mixture | % foam remaining after 30 minutes (w/w) |
|---|---|
| 0 | foam collapsed |
| 10 | 12 |
| 25 | 28 |
| 75 | 34 |
| 90 | 38 |

In each case, the incorporation of as little as 10% protein isolate produced a very significant improvement in the foam stabilisation properties of the mixture, and mixtures containing as little as 25% exhibited an improvement close to the maximum obtainable. The improvements were in all cases greater than would have been expected on the basis of the foam stabilisation properties of the individual components of the mixtures.

EXAMPLE 5

A milk whey feedstock was pasteurised at 72° C. for 15 seconds and was then contacted with an ion-exchange material (regenerated carboxymethyl cellulose made as described in British patent specification No. 1 387 265) for 20 minutes at 50° C. and pH 3.0. The extracted protein was desorbed from the ion-exchange material, after washing, by contact with an aqueous solution at pH 9.0 for 20 minutes. The resulting aqueous protein solution was concentrated by ultra-filtration at pH 9.0 and 50° C. When the concentration reached 12% protein a gel formed, which was found to exhibit functional properties similar to egg white. The total elapsed time from the beginning of the ion-exchange isolation up to the gel formation was 4 hours.

A further quantity of the same milk whey feedstock was subjected to the same ion-exchange and ultra-filtration conditions as above, but the process was conducted at 20° C. instead of 50° C. No gel formed during the ultra-filtration, although the final protein concentration was 25%. The resulting product exhibited functional properties making it especially suitable for use in soft drinks or other beverages as a suspension agent or protective colloid to enable a stable suspension or "haze" to be produced.

The effect on functional properties of the different temperatures used in the isolation and concentration processes is emphasized by the following very different figures for the solubility of the product proteins at pH 4.5:

| | Solubility at pH 4.5 |
|---|---|
| 50° C. product | 30% |
| 20° C. product | 88%. |

EXAMPLE 6

A protein isolate was obtained from milk whey by ion-exchange extraction followed by desorption and concentration of the resulting aqueous solution to a 12% protein content.

Another 12% protein solution was prepared from a commercially available soya protein isolate (made by extraction with caustic soda and subsequent iso-electric precipitation).

In order to test the gelation properties of the isolates, the 12% protein solutions were each heated to 60° C. for 10 minutes. For comparison, the same test was applied to a fresh egg white containing 12% protein and a solution (also approximately 12% protein content) of a protein concentrate obtained from the milk whey by ultra-filtration (U.F.).

The results are shown in the following table:

| Solution | After heating to 60° C. for 10 mins. |
|---|---|
| Milk whey ion-exchange isolate | Firm stable gel |
| Commercial soya isolate | Some thickening |
| Egg white | Firm stable gel |
| U.F. concentrate | No effect |

Whereas the milk whey protein ion-exchange isolate was comparable with egg white, the soya isolate showed little gelling action and the U.F. concentrate showed no gelling action.

EXAMPLE 7

An aqueous soya solution was prepared by adding soya grit (10% w/w) to water and maintaining the pH at 9.0 for 1 hour using 2 M sodium hydroxide. The resulting solution was then added to a diethyl-aminoethyl (DEAE)-regenerated cellulose ion-exchange material in the ratio 3 parts soya protein solution to 1 part of swollen DEAE- cellulose cake, and the pH was again maintained at 9.0 for 1 hour. The ion-exchange material, bearing soya protein extracted from the solution by ion-exchange adsorption, was separated by filtration. The extracted protein was then desorbed from the cellulosic material into an aqueous solution maintained at pH 3.0. The protein solution so obtained (containing 1% soya protein) was concentrated to between 4 and 5% protein content by ultra-filtration.

The DEAE- cellulose was a material made by a process involving reaction of cellulose with diethyl amino ethyl chloride followed by regeneration of the substituted product (see British patent specification No. 1 387 265).

Unlike commercially available soya protein isolate obtained by conventional precipitation techniques (involving initial digestion of soya grit with sodium hydroxide at pH 9-10, followed by precipitation at the iso-electric point, i.e., approximately pH 4), the soya protein isolated by ion-exchange remained soluble in the pH range 3.0 to 4.0, thereby indicating the improved functionality attained by ion-exchange isolation.

Also the following results were obtained in comparative foam stabilisation tests:

| Protein solution at 12% protein content and 15° C. | % of foam remaining after 20 minutes |
|---|---|
| soya ion-exchange isolate | 61% |
| commercial soya isolate | none (foam collapsed). |

We claim:

1. In a process for preparing edible foodstuff materials containing water which comprises at least one of the steps of (a) foaming, (b) stabilizing a foam, (c) binding water, (d) binding fat and (e) gelling by the use of a surface-active protein agent to alter the surface tension of the edible material, the improvement, which comprises; employing as the surface-active agent a surface-active protein agent containing 90 percent or more by weight of protein which has been prepared by extraction from a surface-active protein source by ion-exchange interaction with an ion-exchange material followed by recovery from the ion-exchange material.

2. The process of claim 1 wherein the edible material is a gel.

3. The process of claim 1 wherein the protein source is selected from the group consisting of blood, soya, whey, egg white, milk, a protein containing liquid extract of rape seed, a protein containing liquid extract of groundnuts, a protein containing liquid palm nut extract, a protein containing liquid sunflower seed extract and a protein containing liquid extract of olives.

4. The process of claim 3 wherein the source selected is milk whey.

5. The process of claim 1 wherein the ion-exchange material is derived from a polysaccharide.

6. The process of claim 5 wherein the polysaccharide is derived from a cellulosic material.

7. The process of claim 6 wherein the cellulose material is a regenerated cellulose.

8. The process of claim 1 wherein the ion-exchange material is derived from a member selected from the group consisting of a substituted starch, dextran, agarose and polyvinyl alcohol.

9. The process of claim 1 wherein the edible foodstuff material is selected from the groups consisting of a meringue, a sponge cake, a bread, a marshmallow; a macaroon, a cohered fish, a cohered meat, a cohered vegetable and a beverage.

10. The product of the process of claim 1.

* * * * *